United States Patent
Berube

(10) Patent No.: US 7,830,624 B2
(45) Date of Patent: Nov. 9, 2010

(54) LASER BONDING CAMERA MODULES TO LOCK FOCUS

(75) Inventor: Dennis R. Berube, Cranston, RI (US)

(73) Assignee: Flextronics AP, LLC, Broomfield, CO (US)

( * ) Notice: Subject to any disclaimer, the term of this patent is extended or adjusted under 35 U.S.C. 154(b) by 417 days.

(21) Appl. No.: 11/874,794

(22) Filed: Oct. 18, 2007

(65) Prior Publication Data
US 2009/0103193 A1    Apr. 23, 2009

(51) Int. Cl.
G02B 7/02    (2006.01)

(52) U.S. Cl. .................. 359/819; 348/344

(58) Field of Classification Search ........... 359/819; 348/344
See application file for complete search history.

(56) References Cited

U.S. PATENT DOCUMENTS

| 5,793,540 A | 8/1998 | Ohtsuki et al. |
| 7,233,737 B2 | 6/2007 | DeMonte |
| 2003/0137595 A1 | 7/2003 | Takachi |
| 2004/0109080 A1 | 6/2004 | Chan et al. |
| 2005/0007485 A1 | 1/2005 | Vook et al. |
| 2006/0077575 A1* | 4/2006 | Nakai et al. ............... 359/819 |
| 2007/0058964 A1* | 3/2007 | Shangguan et al. ......... 396/144 |

* cited by examiner

*Primary Examiner*—Scott J Sugarman
*Assistant Examiner*—James C Jones
(74) *Attorney, Agent, or Firm*—Robert G. Crouch; Marsh Fischmann & Breyfogle LLP

(57) ABSTRACT

A method for assembling lens modules using laser bonding of external ramped surfaces. The method includes providing a lens housing with a sidewall with ramped surfaces and providing a lens barrel with external ramped surfaces. The lens barrel is positioned in contact with the lens housing such that the ramped surfaces of the lens barrel mate with the ramped surfaces of the lens housing. The lens barrel is rotated to focus a lens on an image sensor. With a laser, the method includes forming at least two bonds at an interface between the lens barrel and the lens housing such as proximate to the mating ramped surfaces. The bonds are located at equidistant points about the periphery of the lens module. The bonds may be circular or may be elliptical such as with a width along the interface that is at least twice the height of the bond.

22 Claims, 6 Drawing Sheets

LASER BONDING CAMERA MODULES TO LOCK FOCUS

BACKGROUND OF THE INVENTION

1. Field of the Invention

The present invention relates, in general, to the design and manufacture of camera modules, and, more particularly, to the design and manufacture of fixed-focus camera modules having a lens barrel-to-lens housing interface that maintains focus alignment or adjustments between one or more lenses in the barrel and one or more image sensors in the housing.

2. Relevant Background

Digital camera technology is being used in an increasing variety of mass-produced applications. A growing use of digital camera technology is incorporating or providing fixed-focus camera modules in consumer products such as wireless telephones, cell phones, personal digital assistants (PDAs), and other handheld electronic devices. While many consumers demand high-end functionality and quality, many consumers want the functions such as those provided by a digital camera but at affordable prices. Within the next few years, it is expected that more than 65 percent of cell phones will include cameras. Additionally, there are many companies that produce consumer products such as cell phones and PDAs, and this competition requires that components including camera modules be produced with high quality but at acceptable costs with lower per unit material and assembly costs. This is especially true for products in which the camera is a secondary component such as when the product is primarily a communication device.

Fixed-focus camera modules used in many consumer products generally include a lens for focusing incoming light onto an image sensor that detects an image and converts it into an electrical signal representation. An image processor manipulates the image signal into an image that is stored or displayed on a display screen. Camera modules also include a chassis and enclosure for mounting the various electronic and optical components and for protecting the components from particulate and spurious light contamination. Modern digital camera modules are expected to provide high-quality imaging at low cost. Image quality depends on the camera's optics, and in fixed-focus camera modules, the focus is often set as part of the assembly process. Conventional assembly processes for digital camera modules tend to be labor-intensive. In particular, the focusing is often a manual operation in which an operator sets and secures the focus of each individual unit. Typically, setting the focus requires high-precision positioning of the camera's lens relative to the image sensor.

In FIG. 1, a conventional, fixed-focus camera module assembly 100 is shown that may be used to provide digital imaging functionality in consumer product or application such as a wireless or cellular phone. The module 100 is a stacked-die version in which the image sensor 124 is on top of a signal-processor 128. The lens system such as for a megapixel module is provided with a lens barrel 110 with one to three or more lens elements 112, with the number of lenses varying with optical design requirements. With a threaded interface 114, the lens barrel 110 is mounted to a housing 120, and the housing is shown to support an infrared (IR) filter 122 that filters longer-wavelength radiation to limit the noise created in the image sensor 124. A flexible circuit 130 with passive components is attached via solder joints 134 to the bottom of the processor 128 substrate. The components of module 100 are representative of many camera modules used today but many variations such as configuration, location, and number of the lenses 112 may be altered to provide designers and manufacturers alternative designs to suit criteria such as cost, size, shape, available technology, and other design parameters.

Assembly of the camera module 100 includes barrel insertion in which the barrel 110 is inserted into the housing 120. At a focusing station in the assembly process, the lens barrel 110 is rotated on the threaded interface 114 such that the lens elements 112 are focused accurately upon the image sensor 124. The focus may be tested electronically to obtain high quality results. A technician typically will apply two or more drops of adhesive 116, 117 after the focusing process is complete to try to retain the position of the barrel within the housing 120. The camera module 100 is then moved to a separate station along the assembly line to cure the adhesive 116, 117 such as in an oven or the like.

As shown in FIG. 1, conventional camera modules have included high-precision structural features that facilitate setting the proper focus, such as a lens assembly or lens barrel that attaches to the camera housing with screw threads. The threaded attachment provides a mechanism for positioning the focal point on the image sensor, and maintaining planarity between the lens and image sensor. During assembly of a conventional digital camera module, an operator threads the lens assembly onto the camera housing until a proper focus is achieved. The operator then temporarily fixes the threaded lens assembly positioning with drops of adhesive.

For example, the adhesive may be an ultraviolet (UV) glue or adhesive that is used to hold the position of the lens barrel relative to the lens housing once the module is focused in a focusing station by rotating the lens barrel. Proper focus requires that this focus position of the barrel be maintained with even slight movement of the barrel potentially ruining focus or at least reducing quality of resulting images. Presently, the camera module with the unset or partially-cured UV adhesive is moved to a heat curing oven for final cure. Unfortunately, the lens barrel often moves during the transfer of the camera module to the curing station or oven. This can result in the focus shifting, which can cause focus failure and poor yield. In other words, existing manufacturing processes allow focus shift between the initial application of the adhesive and stage in which the adhesive is fully cured. If the UV light cannot penetrate the total glue bond between the barrel and the housing, the adhesive will not totally cure, which could lead to focus shift later in the process. For example, heat from the UV cure oven may cause the focus to shift due to expansion and contraction.

As mass-produced products, camera modules are preferably constructed using low-cost materials such as plastics for as many components as possible including the lens barrel and the housing. However, the use of threads for establishing a proper focus for each manufactured digital camera module limits the ability to use lower cost construction materials as only certain types of materials can support machining and/or high precision molding. These materials are typically more expensive than the materials that are unable to support such processes. Also, it is desirable to minimize per unit costs associated with the assembly process, and the use of a post-focusing stage for curing adhesive increases the cycle time for each camera module as well as requiring additional equipment (i.e., curing ovens and associated equipment) and floor space. Particulate residue from the machining process can remain on the threaded parts and can potentially settle on the image sensor causing failure or lowering quality of digital images produced with the camera module. The use of adhesive also increases the risk of contaminating the interior of the module. Particulate residue is also generated by friction between the threads when they are rotated to set focus.

Hence, there remains a need for improved methods of maintaining focus of a camera module. Such methods may include providing an alternative configuration of the camera module to provide an interface between a lens barrel and a lens housing that provides an alternative to the standard threaded interface and that lends itself to improved barrel-to-housing bonding.

SUMMARY OF THE INVENTION

The present invention addresses the above problems by providing a lens or camera module that is particularly suited for laser welding of the barrel to the housing. In this manner, the modules described herein do not require precision, threaded parts and do not use adhesives to lock a focus setting. Instead, the modules utilize an external ramp design in which a lens housing with a sidewall extending out from a base, with the sidewall having two, three, or more sloped or ramped surfaces. Likewise, the lens barrel includes a similar number of ramped surfaces or ramps on an external surface (such as a sidewall), and these ramps are adapted for mating with the housing ramps such as having a matching drop or rise as the rise or drop of the housing ramps. After initial assembly, the barrel is rotated relative to the housing to focus a lens or lens assembly in the lens barrel to a sensor or sensor assembly that may be mounted in the housing. The barrel is then held or clamped in this position, and a laser source with two, three, or more heads is operated to spot weld the barrel to the housing at the interface or seam between the barrel and housing proximate to the mated or paired external ramps, e.g., with two or more spaced apart bonds that each include fused material from both the barrel and the housing that extends across the lens-barrel interface. The bonding or welding process can be performed at the focusing station such that the module does not have to be moved to another station such as curing oven for additional processing. The assembly process reduces risks of focus shift or failure associated with transferring focused modules prior to locking the barrel position (e.g., before adhesive curing), which increases yield and quality. The assembly process has a shorter cycle time to increase production rates and to lower processing costs as least in part because there is no need for a curing oven or a separate post-focusing process station.

More particularly, a method is provided for assembling lens modules that includes providing a lens housing with a cylindrical sidewall extending from a base. A pair of ramped surfaces is provided at the end of the sidewall opposite the base. A lens barrel is also provided with an external sidewall with a pair of ramped surfaces. The method continues with positioning the lens barrel to contact the lens housing such that the ramped surfaces of the lens barrel mate with the ramped surfaces of the lens housing. The lens barrel is then rotated (or the housing is rotated while the lens barrels is held steady) to focus a lens mounted in the lens barrel. Using a laser or lasers, the method continues with forming at least two bonds at an interface between the lens barrel and the lens housing such as proximate to the mating ramped surfaces.

In some embodiments, the bonds are located at equidistant points about the periphery of the lens module and each of the bonds overlaps the interface or seam between the barrel and housing so as to include at least a portion of the lens barrel and a portion of the lens housing. In some cases, the provided barrel and housing each include three external ramps, and the bond forming step may include targeting three lasers or laser heads upon the module to form three of the bond or spot welds along the interface (e.g., at equidistant locations about the periphery and/or at about a midpoint of the paired ramps). The bonds may be generally circular in shape or, in some cases, it may be useful to provide elliptical shaped bonds with a width (as measured along the interface) that is at least twice the height of the bond. The depth of projection of the bonds is less than the width of the ramped surfaces or ramps such as less than about 60 percent of the width (or of the smallest width value).

The bond forming may vary to practice the assembly method, and in one case where the barrel and housing are formed of a polymeric material such as a polycarbonate, the laser may be powered at less than about 5 volts for a duration of less than about 5 seconds. The material used for the barrel may differ from that used for the housing (such as having one be a glass-filled polycarbonate while the other is an unfilled polycarbonate), and in these cases, it may be useful to have the bond centered near the physical interface or seam but spaced apart a small distance (e.g., such that more of the bond surface is on the lens barrel or the housing) such as by targeting the lasers to have a focus point above or below the interface without an upward or downward angle to the beam.

According to another aspect, a camera module is provided such as a fixed-focus module for use in wireless and cell phones and other electronic devices. The camera module includes a plastic lens barrel with a lens assembly and an external surface with two ramps. A plastic housing is also included that has an external surface with two ramps configured for receiving and mating with the ramps of the lens barrel as the lens barrel is coupled or assembled with the housing. The camera module further includes a laser-generated, weld joint that attaches the lens barrel to the housing. The welded joint includes at least two, space-apart bonds formed at the interface between the mated ramps, e.g., by melting and then cooling material in the barrel and housing proximate to a focus point of a laser near a seam or interface between the ramps.

The plastic of the lens barrel may differ from the plastic used to form the housing, and, in this case, the center of the weld joint may be positioned above or below the interface between mated ramps, with the positioning selected based on the melting points of the plastics (e.g., targeting the component with the higher-melt point plastic to more evenly distribute the heat provided by the lasers). The ramps may have a substantially smooth surface and a width that is greater than the depth of penetration of the bonds. Each of the ramps has a length that is greater than the length or width of the bonds (as measured along the interface). The bonds may be positioned at or near the midpoint of the ramps and be circular in shape or elliptical in shape (e.g., with a length or width that is at least about twice the height of the bond). The lens barrel and housing, in some embodiments, include three of the ramps and the welded joint in these cases typically will include at least three bonds (e.g., a bond per ramp pair or the like).

The camera modules formed by the assembly techniques described herein are well suited for use in electronic devices such as wireless phones, cellular phones, PDAs, and the like that utilize fixed-focus lens modules. For example, the apparatus or device shown in FIG. 1 can be modified to include a module designed and assembled as taught in this description rather than a threaded barrel and housing that are fixed in place with adhesive. More particularly, an apparatus for capturing digital images may be provided that includes a flexible circuit and a housing attached or coupled with that flexible circuit. An image sensor is positioned within the housing. A lens barrel is attached to the housing with a welded joint. The lens barrel includes a lens or lens assembly that focuses images upon the image sensor. The lens barrel includes at least two ramped, external surfaces that are configured to mate with the ramped, external surfaces of the housing (e.g., with similar lengths, widths, and opposite slopes or rises/drops). The welded joint includes two or more spot welds that overlap the interface between the mated external surfaces of the housing and lens barrel. As discussed above, the housing and lens barrel are formed of plastic such as a glass filled polycarbonate, an unfilled polycarbonate, or the like, and the spot weld is achieved by targeting lasers onto the housing and/or the lens barrel proximate (or on) the interface.

DETAILED DESCRIPTION OF THE PREFERRED EMBODIMENTS

Briefly, embodiments of the present invention are directed to methods for fabricating camera modules in a manner that provides a more effective way to lock or fix the position of a lens barrel relative to a lens housing after focusing. The invention is also directed toward the camera modules that are formed with these bonding methods and to devices and products such as wireless phones, cell phones, PDAs, and the like that incorporate the camera modules. In one embodiment, a lens barrel and lens housing are provided with two, three, or more ramps in their mating or interface, external walls (e.g., "external ramps"). These ramps provide an focusing and bonding interface between the lens barrel and lens housing such that rotation of the lens barrel causes a lens or lens assembly of two or more lenses to be positioned nearer or farther away from an image sensor in the lens housing to achieve a desired focus.

Once the external ramp-style lens or camera module is focused (or focus is set), the lens barrel is joined or bonded to the lens housing using lasers targeted at two, three, or more focal point or focus spots on the periphery of the camera module. The focal points of the lasers are proximate to the interface between the barrel and housing such as centered on the interface or slightly above or below to selectively apply more heat to the barrel or housing to generate a desired bond. The bonding is produced by heat from the laser that creates a melt region in both the barrel and housing which generates a joint between the parts at the spaced apart bonds or spot weld locations. The bonds or spot weld locations are typically located equidistant about the periphery of the interface (such as 180 degrees apart when two bonds are used, 120 degrees apart when three bonds are used, and so on). In some embodiments, the focusing and bonding are both performed at a single fabrication stations such as the focusing station. Once the melt region is cooled, the position of the barrel to the housing is fixed and the focus setting for the camera module is locked by the joint provided by the spot welding or laser welding operation.

Hence, the new fabrication method locks the focus position of the external ramp style lens module so that there is no focus shift after the focus is set at the focus station. The fabrication techniques described herein will likely provide at least the following advantages over fabrication using a threaded barrel and adhesive: provide nearly immediate bonding so that there is no movement or change in focus after the module leaves the focus station; no glue post processing; no glue or thread related contamination in the module; reduced fabrication or cycle time; eliminates potential of focus failure caused by heat curing of adhesive; provides improved product quality; and reduces scrap.

Figure 1:
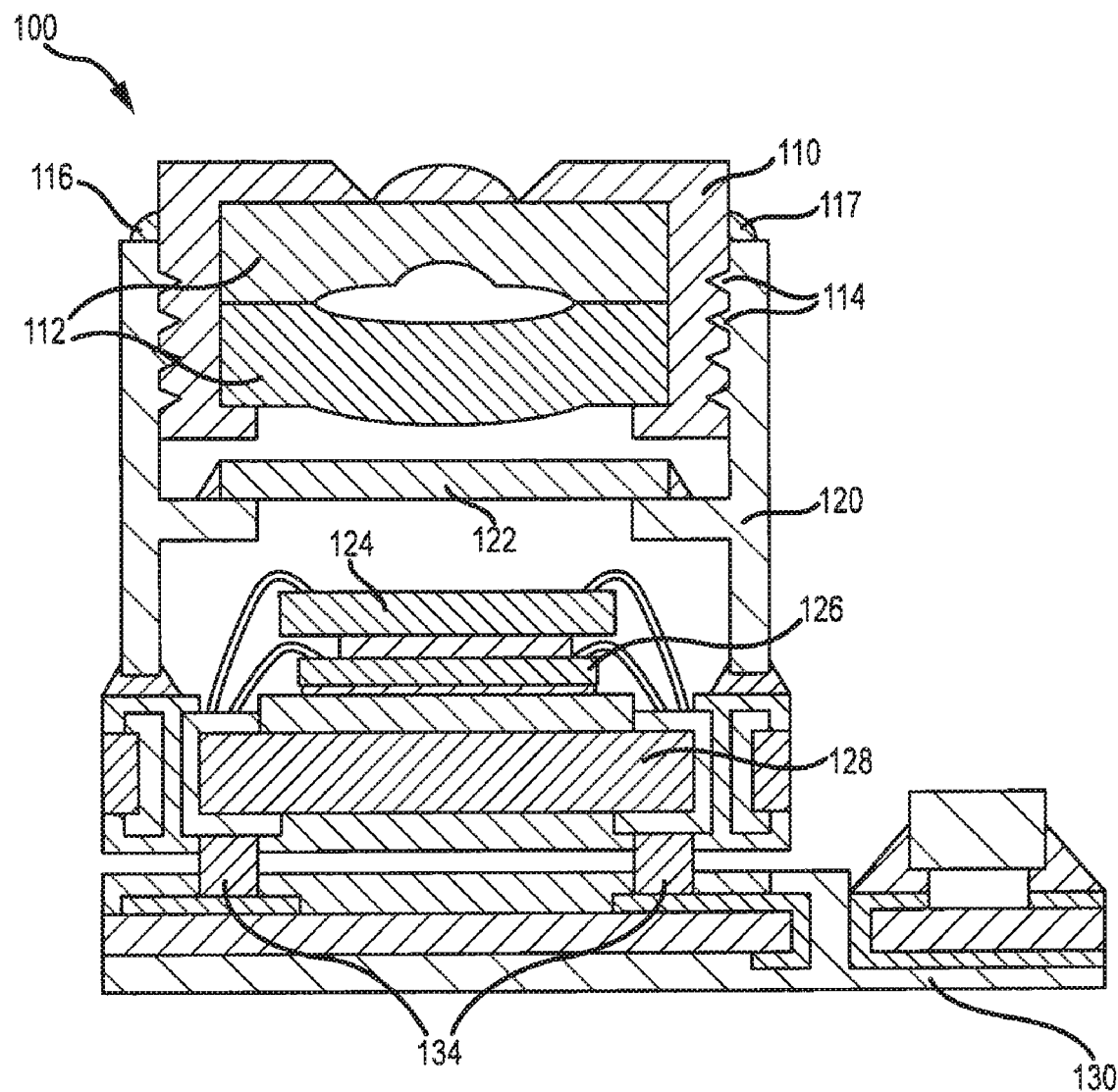
FIG. 1 is a side view of a conventional camera module assembly using a threaded connection between the mount or housing and the lens barrel to provide precision focus setting and using adhesive to set or fix the focus of the module.
Figure 2:
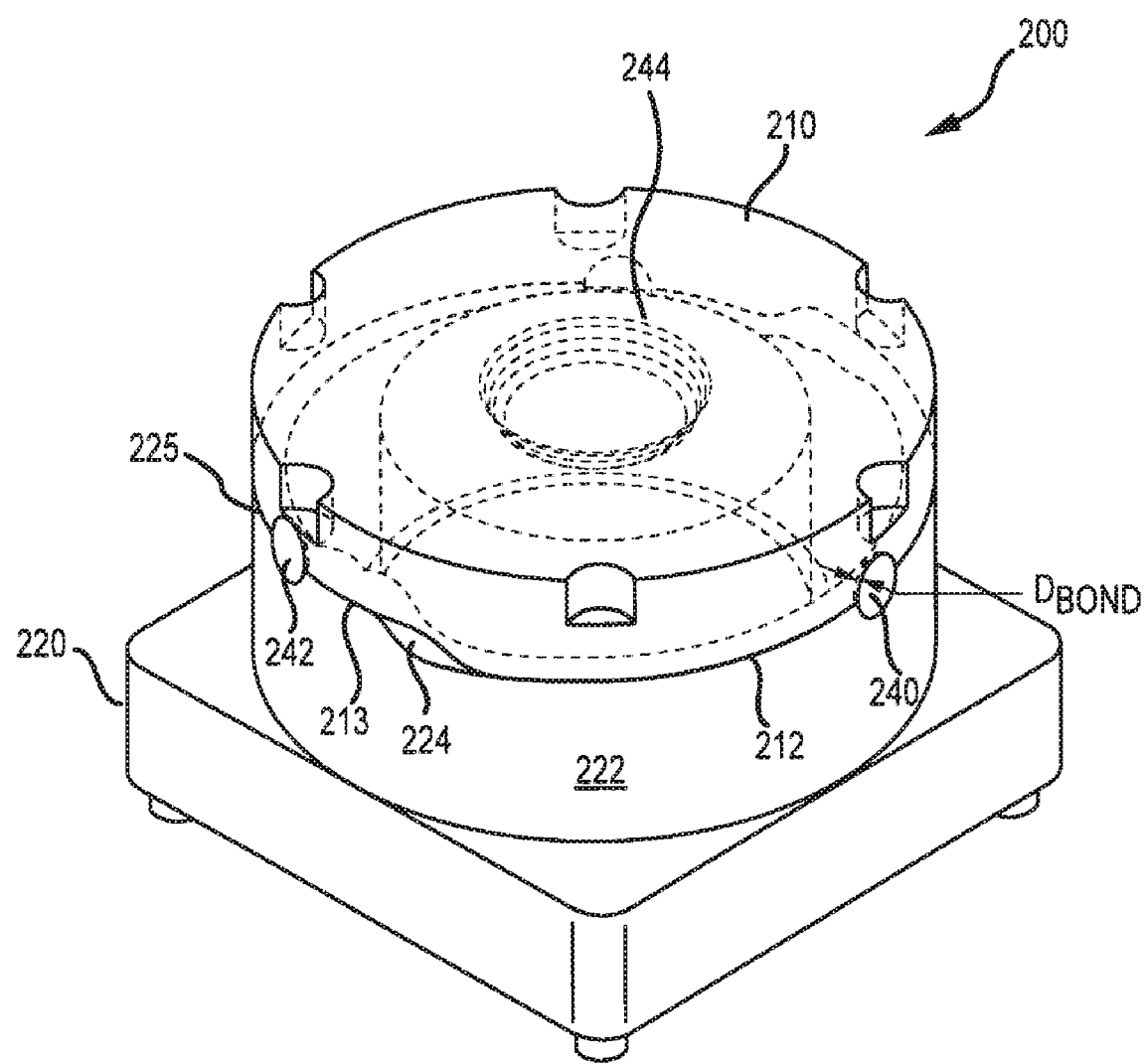
FIG. 2 is a perspective view of an embodiment of a camera module, such as may be used in place of the threaded module shown in FIG. 1, including laser bonding of lens barrel to a lens housing.

FIG. 2 illustrates a camera or lens module 200 with bonding according to an embodiment of the present invention. Additionally, the external ramp structure of the barrel and housing provide a structural interface that enables easy positioning of the lens or lens assembly supported within the lens barrel to accurately focus the module 200 while also providing adequate surface area and material thickness or mass to support laser bonding. The module 200 can be used in the assembly 100 shown in FIG. 1 to replace the threaded barrel and housing combination such as by attaching or providing a flexible circuit and other components as shown in FIG. 1 and the module 200 is suited for inclusion in numerous electronic devices that may use a fixed-focus camera module such as a wireless phone, a cell phone, a PDA, or other electronic device.

As shown, the module 200 includes a lens barrel 210 and a lens housing 220. These can be termed "external ramp" with the barrel 210 including a pair of ramps 212, 213 on its outer wall and the housing 220 including a sidewall 222 with a pair of ramps 224, 225. When the barrel 210 is mated with the housing 220, a physical interface is formed between the contacting or abutting ramps 212 and 224 and ramps 213 and 225. To adjust the focus of the module 200, the lens barrel 210 can be rotated such that the barrel 210 slides on the housing as its ramps 212, 213 slide upon the ramps 224, 225. When focus is achieved, in some embodiments, a retention assembly (not shown) that may include a clamp is used to retain or hold the barrel 210 in this focused position relative to the housing 220 and a laser with 3 heads is used to form the three bonds or bond surfaces 240, 242, 244 about the periphery of the module 200. More specifically, the laser may be focused at or near the interface between the ramps 212 and 224 and ramps 213 and 225 such that the nearby material in the barrel 210 and housing 220 is melted and when cooled the bonds 240, 242, 244 are formed.

The bonds are shown to be centered at the interface but in some cases the center of the bonds may be slightly above or below this physical interface. Also, the bonds 240, 242, 244 are shown as circular with a particular diameter, $DIA_{BOND}$, but in other cases, non-circular shapes may be used such as more oval or elliptical shaped surfaces. The diameter may vary to practice the invention with a particular choice depending on parameters such as size of the module 200, materials used for the barrel 210 and housing 220, and desired strength (e.g., as may be measured by push out strength or other criteria). For example, spots or bonds providing the welded joint may have diameters, $DIA_{BOND}$, ranging from 0.7 to 3 millimeters (mm) with bonds of 1 to 2 mm being used in some embodiments. The size of useful bonds or spot welds is discussed in more detail with reference to FIGS. 4 and 5 and will likely vary to suit particular design parameters such as desired strength of the joint and also based on the materials used and its characteristics (e.g., polymeric materials or plastics are often used to fabricate by molding or the like the lens barrel 210 and housing 220 and which material is chosen may effect the size of the spot welds utilized for the joint such as whether a polycarbonate is used or a glass-filled polycarbonate is used).

Figure 3:
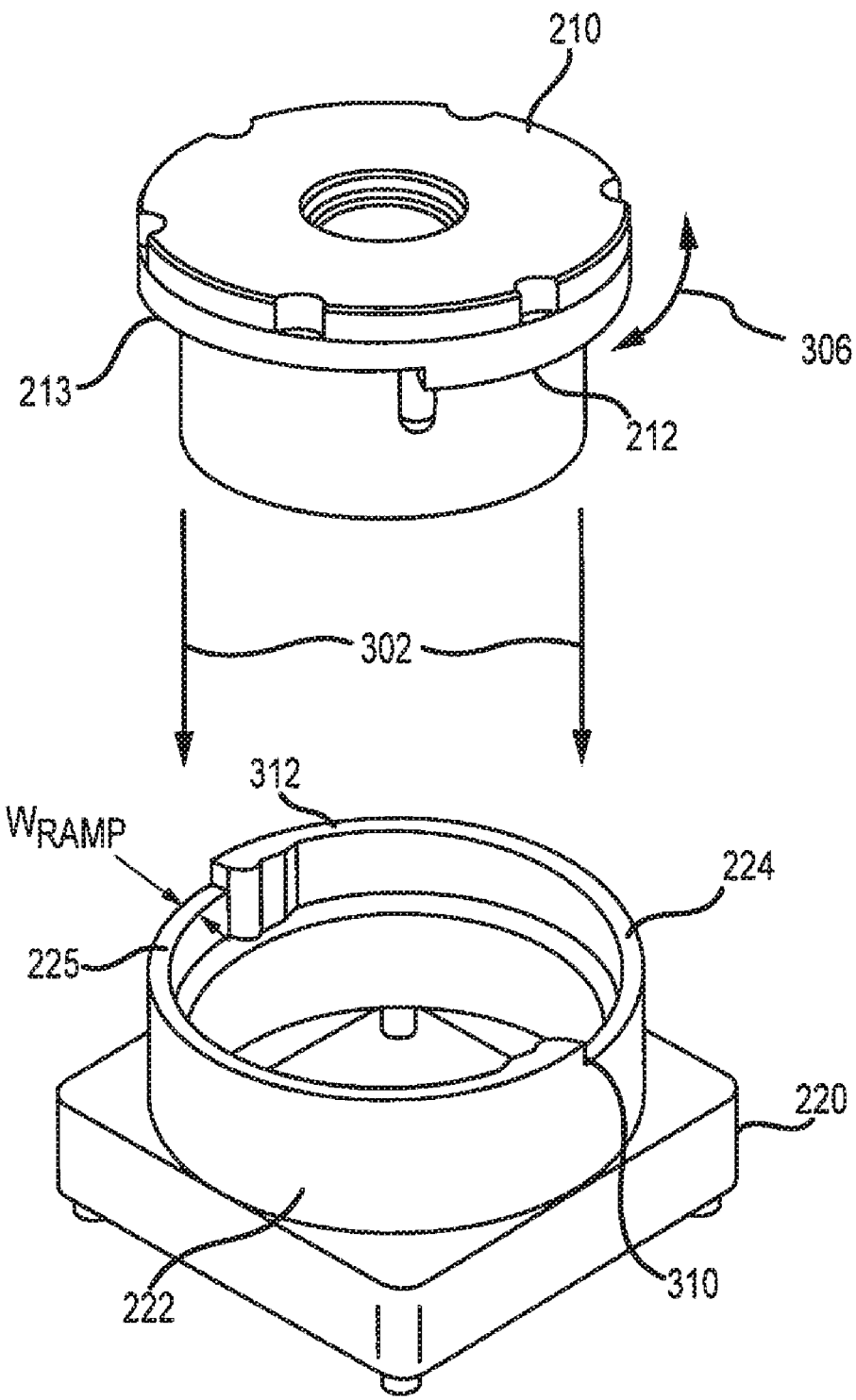
FIG. 3 illustrates an exploded view of the camera module of FIG. 2 showing use of two external ramps provided on the barrel and on the housing for the module focusing and bonding interface.

FIG. 3 is an exploded or disassembled view of the module 200 that shows the lens barrel 210 and the lens housing 220 in further detail. Specifically, the ramps 224, 225 provided in the sidewall 222 of the housing 220 are shown prior to assembly 302 with barrel 210. The ramps 224, 225 typically have a thickness or width, $W_{RAMP}$, that is equal to the thickness of the wall 222 or a portion of such thickness. The ramp width, $W_{RAMP}$, is generally selected such that there is an adequate amount of material available in the wall 222 at the location of a spot weld to form a desirable bond or joint and, further, it is often desirable that the bond has a depth of penetration that is less than the ramp width, $W_{RAMP}$, to avoid contamination of the interior of the module 200 in the bonding process (as is discussed further below).

Upon assembly as shown with arrows 302, the ramps 224, 225 mate oppositely configured ramps 212, 213, which may have about the same width or a width that is greater or smaller as long as the width exceeds the depth of penetration of the bond or spot welds. After assembly, the barrel 210 will be rotatable as shown with arrow 306 to allow focusing of the module 200 as the ramps 212, 213 slide upon the ramps 224, 225. The ramps 224, 225 (and ramps 212, 213) may be defined also by the amount of drop or rise from one end 310 to another end 312 (e.g., difference in location relative to an axis of the housing 220 or barrel 210 as measured by planes passing perpendicularly through the axis). The amount of drop is selected to provide a desired range of focusing or ability to alter the focal point(s) of the lens or lenses (not shown in FIG. 3) provided in the lens barrel 210. For example, the dimensions of the module 200 may include a lens housing 220 with a sidewall 222 having an outer diameter of several millimeters to 20 or more millimeters with some embodiments calling for outer diameters of 7 to 10 mm. The width of the ramp, $W_{RAMP}$, will typically be in the range of 0.5 to 2 mm but other widths may be used, and several embodiments use a width of about 0.60 to 0.85 mm to provide adequate material thickness for joining the barrel 210 to the housing 220 via laser spot welding. The dimensions of the lens barrel 210 including the width of the ramps 212, 213 and their location is chosen to be compatible with those of the housing 220 (or vice versa) such as having ramp widths similar in size to those of the ramps 224, 225. The drop or rise of the ramps 212, 213, 224, 225 in the above examples may vary but in some embodiments are selected from the range of about 0.3 to 0.7 mm with or in some cases from about 0.4 to 0.5 mm.

Figure 4:
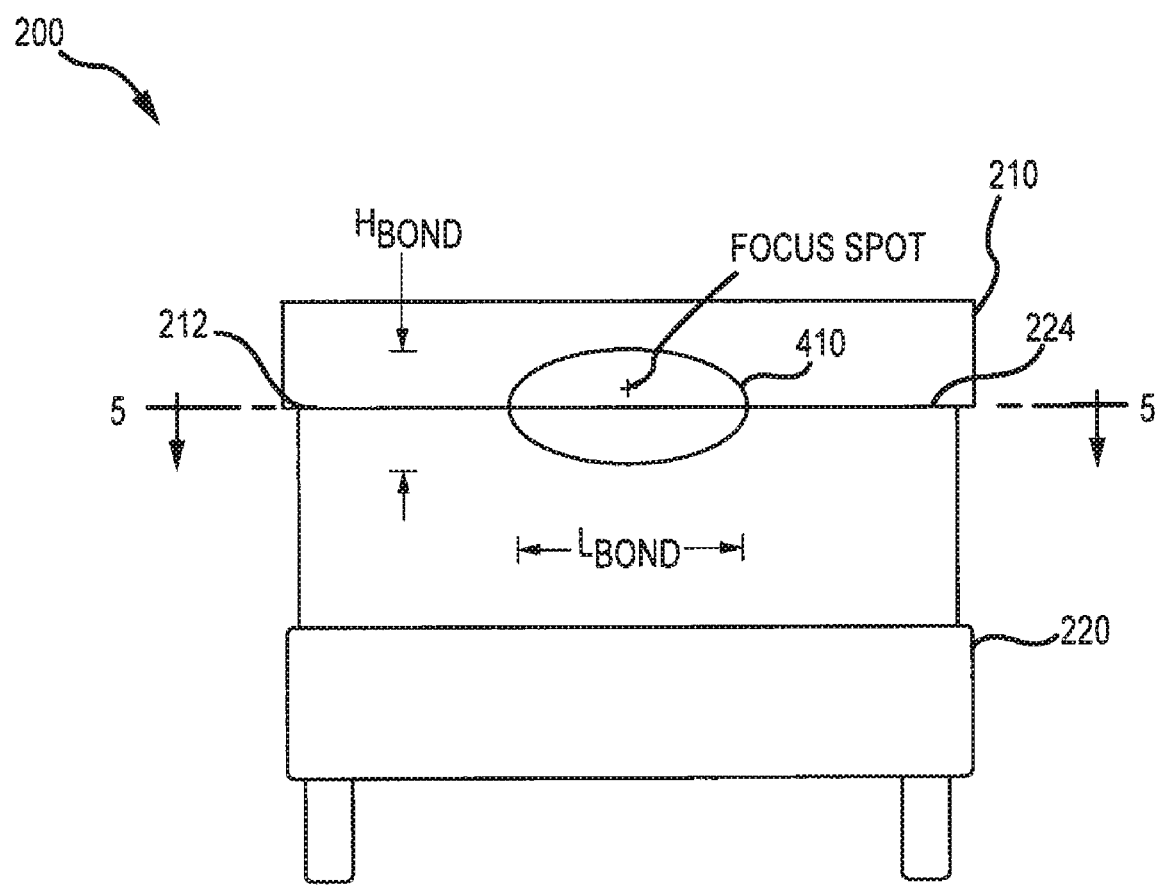
FIG. 4 is a side view of the camera module of FIGS. 2 and 3 with oval bonds rather than circular bonds and showing a laser focal point or focus spot that is slightly off center (e.g., not exactly at the interface such as above the interface)

The use of lasers to perform the spot welding of the barrel 210 to the housing 220 at the interface between the external ramps of these components allows the shape of the bond or spot weld to be varied to some degree. For example, the bonds 240, 242, 244 shown in FIG. 2 are generally circular in shape, but, in some cases, a bond with different characteristics such as a stronger bond may be formed by altering the focus of the lasers so as create bonds or spot welds that are more elliptical in shape. FIG. 4 illustrates a camera or lens module 200 in which the lens barrel 210 is attached to the lens housing 220 with two or more elliptical bonds or spot welds 410 (e.g., a weld 410 provided at 2, 3, or more equally spaced-apart locations about the periphery of the interface between ramps such as ramps 212, 224). The bond or spot weld 410 is shown to be wider than it is tall with the width or length of the bond, $L_{BOND}$, along the interface between the ramps, being greater than the height of the bond, $H_{BOND}$. In other examples, the spot weld or bond 410 may be taller than it is wide. Additionally, the shape of the bond 410 likely will not be perfectly elliptical and can be nearly any shape to practice the invention such as a generally elliptical shape that is defined by a surface within a rectangular boundary including a circular weld. As discussed earlier, the specific dimensions can vary widely to achieve a joint of particular strength, but in an embodiment in which three equidistant bonds or spot welds are utilized, it may be useful to provide an elliptical bond or spot weld with a height, $H_{BOND}$, in the range of about 0.50 to 3.00 mm such as 1.25 to 1.75 mm or the like and a width or length, $L_{BOND}$, in the range of about 1.00 to 5.00 mm such as 2.00 to 3.00 mm (e.g., a height, $H_{BOND}$, of 1.5 mm combined with a length, $L_{BOND}$, of 2.7 mm).

FIG. 4 also illustrates a focal point or focus spot in the bond 410, and this is intended to represent the point upon which a laser beam was directed to create the bond 410. As shown, the focus spot was targeted a distance above the physical interface between the ramp 212 of the barrel 210 and the ramp 224 of the housing 220 on the barrel 210. This may be desirable in a number of situations such as when the laser is angled downward onto the module 200 or when the material of the barrel 210 differs from the material of the housing 220 (e.g., has a higher melting point so that it is useful to apply more energy to the barrel 210 than to the housing 220 to form a useful bond or welded joint with more equal melting of the adjacent materials). In other embodiments, such as when the laser is generally perpendicular to the sidewalls of the module 200 and/or the materials are similar for the barrel 210 and housing 220, it may be desirable to have the focus spot fall upon the crack or physical interface between ramps 212, 224. While in other cases, the focus point may be provided below the interface or upon the housing 220, and in yet other cases, the focus point may be off-center relative to the elliptical, circular, or other shaped bond or welded joint.

Figure 5:
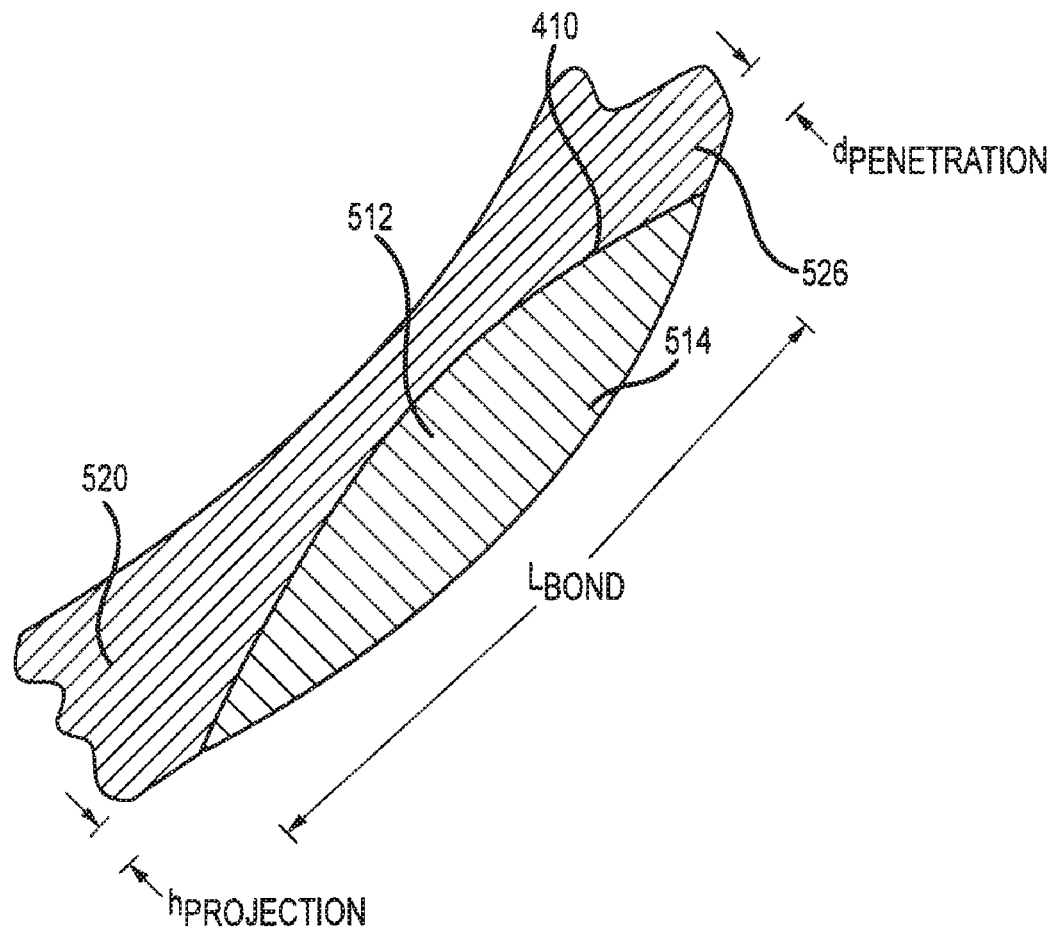
FIG. 5 is a sectional view of the bonded interface of the module in FIG. 4 illustrating depth of penetration and height of projection of one representative interface weld or bond.

FIG. 5 illustrates a cross section of the bond or spot weld 410 that is used to form a welded joint in the module 200 of FIG. 4. As shown, the bond 410 has a width or length, $L_{BOND}$, that extends along the periphery of the joined barrel and housing sidewall. The bond 410 is formed from material from each component that has melted and fused to form the bond 410. The bond 410 penetrates into the sidewalls a penetration depth, $d_{penetration}$, as shown with portion 512 that is preferably less than the thickness of the thinner of the two sidewalls, such as to a depth of less than about 75 percent of such sidewall thickness and more typically less than about 40 to 60 percent of such sidewall thickness. Also, the bond 410 also projects outward from the sidewalls as shown with material portion 514 at a height, $h_{projection}$, that preferably is less than the amount of penetration and is kept to an acceptable amount, which may vary with the particular application. Another feature of the module interfaces of the invention is that the bonds 410 typically do not extend about the entire periphery, i.e., spaced apart spot welding is used rather than a continuous seal weld in most applications. To this end, the ramps of both the housing 220 and the barrel 210 extend a distance on either side of the bond 410 as is shown with wall/ramp portions 520, 526 adjacent the bond 410. Hence, the ramps are configured such that after the bond 410 is formed there remains material in the ramp/side wall on three sides of the bond penetration 512 to provide structural support to maintain the focus of the lens barrel relative to the lens housing while also controlling or even preventing contamination of the module dues to the welding or bonding process.

Figure 6:
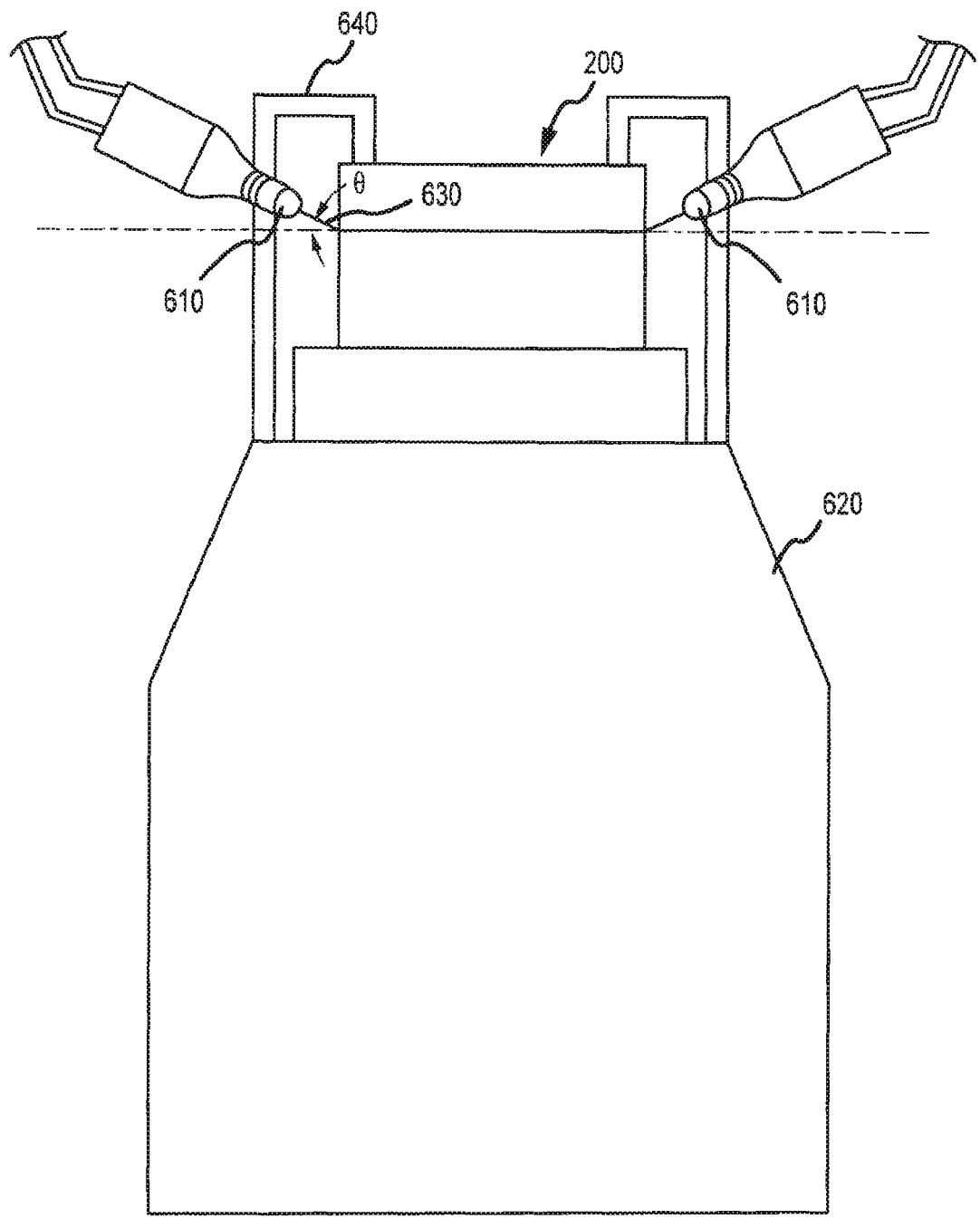
FIG. 6 illustrates a simplified focus station incorporating lasers or a laser welding assembly for setting or fixing the barrel to the housing after finding a desired focus for the module.

The use of laser bonding or welding rather than an adhesive is desirable in part because it can be achieved without additional processing after a focus station. With this in mind, FIG. 6 illustrates a simplified focus station 600 that can be used to create the welded joints described herein. In operation, a camera or lens module 200 may be provided on nesting or mounting device 620. Focusing, and testing of such focusing, may then be carried out using equipment well known by those skilled in the art (and not shown in FIG. 6 for the sake of simplicity). Focusing is completed such as by rotation of the barrel of the module 200 as discussed with reference to FIGS. 2 and 3.

A set of lasers 610 (or heads for focusing a beam from one laser source) is provided that are focused or targeted upon the module 200. The lasers 610 generate beams 630 that on a focal point or focus point of the module 200, such as upon or slightly spaced apart from the interface of the barrel and housing external ramps. As shown, three lasers 610 are provided to form a welded joint in the module 200 including three bonds or spot welds about the periphery of the module, and the bonds are typically spaced apart, e.g., spaced apart about 120 degrees. The lasers 610 are positioned or focused to provide the beams 630 at an angle, θ, which may vary to practice the invention such as from about −45 to +45 degrees or the like, with 0° used in some cases while others use angles of plus or minus 15 to 30 degrees to obtain somewhat unequal heating of the barrel or the housing. A jig assembly 640 may be provided to hold the position of the barrel to the housing of the module 200 after focus is achieved and during laser welding operations to apply a force that keeps the external ramps in contact as the material melts and later cools in each component. After completion of the welding, three bonds or spot welds are created that lock the barrel in its focused position relative to the housing, and the module 200 can be transferred to another assembly or fabrication station (such as for addition of a flexible circuit, insertion into a phone or other electronic device, or the like) or packaged for shipping to another manufacturing facility. During production, in some embodiments, the focusing head itself will apply downward pressure to hold position of the barrel to the housing after focus.

A series of experiments were performed utilizing module configured as shown for module 200 of FIG. 2. The lens barrel 210 was formed of an unfilled polycarbonate while the housing was formed in a first set of experiments of a glass-filled polycarbonate and in a second set of experiments of an unfilled polycarbonate. The housing sidewall 222 had an outer diameter of about 8 millimeters and the ramps had a depth/rise of about 0.43 mm with ramps 212, 213 having a width of about 0.7 mm and ramps 224, 225 having a width of about 0.4 mm (but being arranged such that the outer sidewalls were basically flush on the outer surface of the module 200). Prior to bonding, the barrel 210 of each test module 200 was inserted into the housing 220 and rotated to a focus point. Light downward pressure was applied to hole the barrel 210 against the housing 220 so that neither part moved or separated during bonding (e.g., by a fixture designed to clamp the barrel to the housing). The laser assembly (such as the one shown in FIG. 6) was provided to target 3 beams upon the module 200 at 3 equidistant points about the ramp interface (e.g., the focusing and bonding interface) of the module 200. In the experiment, each laser was set at about 120 degrees apart with each head adjusted to align the focus spot on the seam between the barrel 210 and housing 220, and the spot size of the beam was also adjustable (and generally corresponded with the resulting bond or spot weld) such as from 0.8 to 1.2 mm or the like when the shape is circular. A separate power unit was also provided for each laser head.

An objective of the testing was to provide three bonds or spot welds on a module that together would provide a desired strength for a camera module, with 6 pounds of push out force being used to measure this minimum bond strength. Also, it was generally desired that the bonds or spot welds wound be no deeper (i.e., have a depth of penetration no greater) than necessary to achieve this defined minimum bond strength. For this experiment, but not necessarily as a design limitation, the bond or spot weld was positioned substantially equally on the barrel 210 and on the housing 220 (i.e., the surface area of the bond was about half on the barrel 210 and half on the housing 220). It was desired also to have a bond projection height of less than about 0.1 mm and a range of bond penetration depths such as 0.10 mm, 0.15 mm, 0.20 mm, 0.25 mm, 0.30 mm, 0.35 mm, and the like as well as a range of bond diameters such as 0.8 mm to 1.2 mm.

With laser power levels of 2.8 to 3.5 volts and times of 0.2 to 1 seconds, numerous modules 200 were formed with focusing and bonding interfaces bonded together using the laser welding techniques described above. The laser power level is generally related to how aggressive the laser action will react with contact with the surface of the part, and the time setting is related to the amount of heat generated. These two variables along with the size of the bond or weld spot can be changed to achieve a desired welded joint in a module 200 such as to achieve a desired push out force while also creating a bond with a desirable appearance (e.g., without excessive projection or cratering). When the bond or spot weld diameter was relatively small such as less than about 1.1 mm the push out force was often unacceptable (e.g., less than about 6 pounds push out).

A more acceptable and/or desirable welded joint was achieved when the bond or spot weld diameter was increased in size to about 1.4 mm or larger. Push out force for modules formed with this larger diameter spots was typically about 6 pounds when the power level was 2.8 volt to 3.5 volts and the time exceeded about 0.2 seconds and the depths of penetration and heights of projection were also acceptable. Some of the bonds, though, had a cratered appearance with some bubbling of the adjacent sidewalls. These bonds, while providing adequate bond strength, may be considered unacceptable in some applications (e.g., where appearance is a concern and/or where the risk of contamination has to be kept very low). These tests also showed that the use of two differing material (e.g., glass-filled and unfilled polycarbonate for example) may result in the wall materials near the ramps melting at differing rates.

To achieve further improved results, it was determined that it may be useful in some applications to increase the area of the bond or spot weld overall and, more specifically, along the length of the interface (e.g., along the seam or edges at the contact area between the barrel ramp and the housing ramp). This can be achieved with a larger diameter circular spot or with an elliptical or oval shaped bond or spot weld. For example, a laser that can be focused to provide an oval or elliptical beam may be used to provide a bond or spot weld that is elliptical such as with a width or length that is about 2 times or greater than its height as this would increase the surface area of the bond by about 2 times at each location of the welded joint of the module. These tests also indicated that the location of the bond or spot weld relative to the physical interface between the adjacent ramps also affects the melt and resulting welded joint.

In some embodiments, the laser is targeted to provide a focus point (or "center") of the bond or spot weld that is shifted a distance above or below the physical interface to improve the resulting bond or spot weld. In other embodiments, this shifting of the bond location is combined with an angling of the laser heads to provide the beams to the part or module at angle greater or less than zero (or such angling may be done without shifting of the bond from the interface). It was also determined from this experiment that in some embodiments modules in which the barrel and housing are both formed from the same material or materials with similar properties (e.g., melting point) may be useful such as by using unfilled polycarbonate for both the housing and the barrel as this may improve melt penetration, bond surface appearance, and push out force.

A second series of experiments were run with a module 200 as shown in FIG. 2 with the particular dimensions as described for the prior experiments. A laser assembly was again provided to provide three equidistant spots on a module held on a nest by a finger clamp, e.g., a laser with 3 adjustable heads such as air-cooled, fibered diodes rated for 25 watts or the like. A large number of cycles were performed to evaluate and select useful bonding processes and modules with particular bonded interface designs. For example, the criteria may include a minimum push out force of about 8 pounds separation along with providing a bond with a desirable visual appearance, which may be determined by no crater or excessive sink, no blistering or raised skin, no flaking particles or contamination, and no or little smoking/burning during welding.

In one portion of this second series of experiments, bonding was performed for an unfilled polycarbonate barrel and housing. Three bonds or spot welds that were elliptical as shown in FIG. 4 with a length or width of about 2.7 mm and a height of about 1.5 mm were formed on each module with the power and weld time being varied. Generally, the modules were found to be useful with push out force exceeding or being at least about 8 pounds. In some cases, the visual appearance met the visual criteria to a higher degree. The power was varied from about 2.9 volts to about 5.7 volts and the weld time was varied from about 0.2 seconds to about 3 seconds. Additionally, some of the bonds or spot welds were formed with centers (or laser target points of focus points) positioned above the centerline or above the physical interface of the ramps. Exemplary processes that produced modules that met the strength criteria (e.g., over 8 pounds push out force) and visual criteria includes providing three lasers operated at 3.2 volt power levels for about 3.0 seconds to produce a push out force of 16 to 18 pounds. Another useful result was achieved with lasers operated at 5.7 volts at only about 0.2 seconds to achieve 12 to 14 pounds push out. When a 10% glass filled polycarbonate housing was used with an unfilled polycarbonate barrel, good results were achieved with a bonding process that used three lasers operating at 3.2 volts for about 4.5 seconds to achieve a push out force of about 14 to 16 pounds and also with a bonding process that used three lasers operating at 3.3 volts for about 2 seconds-off for 1 second-on for 2 more seconds to achieve a similar push out of about 14 to 16 pounds.

These series of tests appeared to show that a higher power for the laser combined with a shorter duration resulted in a bond with more desirable appearance while also providing an acceptable push out force. The tests also showed that glass-filled material may be welded more effectively with lower power and longer time to control blistering, and also showed that the focus of the spot can be moved or targeted as appropriate for the configuration and materials of the two components to more evenly distribute power to over the bond area (e.g., so as to provide two thirds of the surface area above or below the interface or the like). Additionally, it seems that in many cases an elliptical or non-circular bond may provide higher quality results.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the illustrated camera modules included lens barrels and housings that each had two ramps that interacted with each other to provide a focusing and bonding interface. The fabrication method is also applicable to barrels and housings with different numbers of ramps such as three, four, or more, e.g., an external ramp lens barrel and an external ramp lens housing may be molded from plastic or other materials with three ramps to provide further distribution of the focus movement. Also, the illustrations generally show three bonds or laser seal locations but those skilled in the art will understand that this may be varied from 2 to 5 or more. In some embodiments, the number of bonds will be selected to match the number of ramps, and the bond or laser seal locations may optionally be selected to be located at a similar point of each ramp (e.g., about on a mid-point of the ramp-to-ramp interface between the barrel and the housing). Yet further, the shape of the laser projection on module to affect bonding was generally described as being round/circular or oval with oval typically producing a better bond in the performed testing. However, other shapes may be useful in some embodiments such as a rectangular shape to cover greater length without increasing the width, other polygonal shapes, and other shapes.

I claim:

1. A method of assembling a lens module, comprising:
providing a lens housing with a cylindrical sidewall extending from a base, wherein the sidewall comprises a pair of ramped surfaces at an end distal to the base;
providing a lens barrel with an external sidewall comprising a pair of ramped surfaces;
placing the lens barrel in contact with the lens housing with the ramped surfaces of the lens barrel mating with the ramped surfaces of the lens housing;
positioning the lens barrel relative to the lens housing to focus a lens mounted in the lens barrel; and
with a laser, forming at least two bonds joining the lens barrel to the lens housing, wherein the bonds are located proximate to the mating ramped surfaces;
wherein the bonds are located at equidistant points about the periphery of the lens module and each of the bonds overlaps an interface between the lens barrel and the lens housing adjacent the mating ramped surfaces, the bonds including at least a portion of material of the lens barrel and a portion of material of the lens housing;
wherein the forming comprises forming at least three bonds at the interface.

2. The method of claim 1, wherein the sidewall of the lens barrel comprises a third one of the ramped surfaces and the sidewall of the lens housing comprises a third one of the ramped surfaces and wherein each of the bonds is located at a portion of the interface associated with a pair of the mating ramped surfaces.

3. The method of claim 1, wherein the bonds are each elliptical in shape.

4. The method of claim 3, wherein each of the bonds has a width as measured along the periphery of the module that is greater than twice a height of the bonds as measured transverse to the interface.

5. The method of claim 1, wherein the each of the bonds has a depth of projection that is less than a width of the ramped surfaces.

6. The method of claim 1, wherein the depth of projection is less than about 60 percent of the width of the ramped surfaces.

7. The method of claim 1, wherein the lens barrel and the lens housing comprise a polymeric material, wherein a power provided by the laser is less than about 5 volts during the forming, and a duration of the forming is less than about 5 seconds.

8. The method of claim 7, wherein the polymeric material is glass-filled polycarbonate or unfilled polycarbonate.

9. The method of claim 1, wherein the center of each of the bonds is proximate to the interface and spaced apart from the interface.

10. A camera module for use in electronic devices, comprising:
    a plastic lens barrel comprising a lens assembly and an external surface with two ramps;
    a plastic housing comprising an external surface with two ramps configured for receiving and mating with the ramps of the lens barrel as the lens barrel is coupled with the housing;
    a laser-generated, weld joint attaching the lens barrel to the housing, wherein the welded joint comprises at least two, spaced-apart bonds formed in an interface between the mated ramps;
    wherein the plastic of the lens barrel differs from the plastic of the housing.

11. The camera module of claim 10, wherein a center of the weld joint is positioned above or below the interface between the mated ramps based on melting points of the plastics, whereby melting of the plastics in the bonds is more evenly distributed.

12. A camera module for use in electronic devices, comprising:
    a plastic lens barrel comprising a lens assembly and an external surface with two ramps;
    a plastic housing comprising an external surface with two ramps configured for receiving and mating with the ramps of the lens barrel as the lens barrel is coupled with the housing;
    a laser-generated, weld joint attaching the lens barrel to the housing, wherein the welded joint comprises at least two, spaced-apart bonds formed in an interface between the mated ramps;
    wherein the ramps each comprise a substantially smooth surface with a width greater than a depth of penetration of the bonds.

13. The camera module of claim 12, wherein each of the ramps has a length greater than a length of the bonds and wherein each of the bonds is positioned at a midpoint of an adjacent pair of the ramps.

14. A camera module for use in electronic devices, comprising:
    a plastic lens barrel comprising a lens assembly and an external surface with two ramps;
    a plastic housing comprising an external surface with two ramps configured for receiving and mating with the ramps of the lens barrel as the lens barrel is coupled with the housing;
    a laser-generated, weld joint attaching the lens barrel to the housing, wherein the welded joint comprises at least two, spaced-apart bonds formed in an interface between the mated ramps;
    wherein the lens barrel comprises three of the ramps and the housing comprises three of the ramps and wherein the weld joint comprises three of the bonds positioned adjacent a mated pair of the ramps.

15. The camera module of claim 14, wherein the bonds are generally elliptical in shape with a length measured along the interface of the module that is at least about twice a height as measured transverse to the interface.

16. An apparatus for capturing digital images, comprising:
    a flexible circuit;
    a housing attached to the flexible circuit, the housing including an image sensor and a sidewall with at least two ramped, external surfaces; and
    a lens barrel attached to the housing with a welded joint, the lens barrel including a lens focused on the image sensor and including at least two ramped, external surfaces mating with the ramped, external surfaces of the housing sidewall, wherein the welded joint comprises at least two spot welds overlapping an interface between the mated external surfaces of the lens barrel and the housing;
    wherein the housing and the lens barrel are formed of plastic and the spot welds comprise bonds formed by targeting lasers onto the housing or the lens barrel proximate to the interface.

17. The apparatus of claim 16, wherein the bonds are elliptical with a width as measured along the interface that is at least about twice a height as measured transverse to the interface and wherein the bonds have a depth of penetration less than a width of the mated external surfaces.

18. An apparatus for capturing digital images, comprising:
    a flexible circuit;
    a housing attached to the flexible circuit, the housing including an image sensor and a sidewall with at least two ramped, external surfaces; and
    a lens barrel attached to the housing with a welded joint, the lens barrel including a lens focused on the image sensor and including at least two ramped, external surfaces mating with the ramped, external surfaces of the housing sidewall, wherein the welded joint comprises at least two spot welds overlapping an interface between the mated external surfaces of the lens barrel and the housing;
    wherein the lens barrel comprises three of the ramped, external surfaces and the sidewall of the housing comprises three of the ramped, external surfaces and wherein the welded joint comprises three of the spot welds positioned about the periphery of the interface.

19. A method of assembling a camera module, comprising:
    providing a housing with ramped, external surfaces;
    providing a lens barrel with ramped, external surfaces;
    placing the lens barrel in contact with the housing with the ramped, external surfaces of the lens barrel contacting the ramped, external surfaces of the housing;
    positioning the lens barrel relative to the housing to focus the camera module; and
    operating a laser assembly to form a welded joint joining the lens barrel to the housing at an interface of the ramped, external surfaces;

wherein the welded joint comprises at least three bonds at the interface and wherein the ramped, external surfaces of both the lens barrel and the housing comprise three ramps.

20. The method of claim 19, wherein the bonds are each elliptical in shape, wherein each of the bonds has a width as measured along the periphery of the module that is greater than twice a height of the bonds as measured transverse to the interface, wherein the each of the bonds has a depth of projection that is less than a width of the ramped surfaces.

21. The camera module of claim 10, wherein the bonds are generally elliptical in shape with a length measured along the interface of the module that is at least about twice a height as measured transverse to the interface.

22. The camera module of claim 12, wherein the bonds are generally elliptical in shape with a length measured along the interface of the module that is at least about twice a height as measured transverse to the interface.

* * * * *